US006589319B2

(12) United States Patent
Ikuma et al.

(10) Patent No.: US 6,589,319 B2
(45) Date of Patent: Jul. 8, 2003

(54) CANISTER HAVING LIQUEFIED FUEL TREATING FUNCTION

(75) Inventors: Kouichi Ikuma, Hamakita (JP); Takashi Sakagami, Hamakita (JP); Takenori Suzuki, Hamakita (JP)

(73) Assignee: Toyo Roki Seizo Kabushiki Kaisha, Shizuoka-Ken (JP)

( * ) Notice: Subject to any disclaimer, the term of this patent is extended or adjusted under 35 U.S.C. 154(b) by 0 days.

(21) Appl. No.: 09/984,731

(22) Filed: Oct. 31, 2001

(65) Prior Publication Data

US 2002/0026874 A1 Mar. 7, 2002

(51) Int. Cl.[7] ................................................ B01D 53/04
(52) U.S. Cl. ............................ 96/144; 96/147; 123/519
(58) Field of Search .......................... 96/144, 147, 396; 55/385.3, DIG. 19; 123/518, 519, 520, 521

(56) References Cited

U.S. PATENT DOCUMENTS

| | | | | |
|---|---|---|---|---|
| 4,750,465 A | * | 6/1988 | Rediker et al. | 123/519 |
| 4,853,009 A | * | 8/1989 | Turner et al. | 123/519 |
| 4,894,072 A | * | 1/1990 | Turner et al. | 123/519 |
| 5,119,791 A | * | 6/1992 | Gifford et al. | 123/516 |
| 5,304,235 A | * | 4/1994 | Watanabe et al. | 123/519 |
| 5,641,344 A | * | 6/1997 | Takahashi et al. | 123/519 |
| 5,910,637 A | * | 6/1999 | Meiller et al. | 123/519 |
| 6,425,380 B2 | * | 7/2002 | Yamada et al. | 123/519 |

FOREIGN PATENT DOCUMENTS

| | | | |
|---|---|---|---|
| EP | 0556488 A1 | * | 8/1993 |
| JP | 6-108933 A | * | 4/1994 |
| JP | 2000-320406 A | * | 11/2000 |

* cited by examiner

*Primary Examiner*—David A. Simmons
*Assistant Examiner*—Frank M. Lawrence
(74) *Attorney, Agent, or Firm*—Young & Thompson

(57) ABSTRACT

A canister having a liquefied fuel treating function capable of flexibly coping with layout restrictions without the need to bend the purging path in the middle. The canister having the liquefied fuel treating function includes a liquid storing case having an introducing path communicating with a fuel tank, and a purging path communicating with air inlet pipes of an engine; and a sucking path, provided in the liquid storing case, and sucking the liquefied fuel stored in the liquid storing case; which sucks up the liquefied fuel onto the purging path side by use of the flow of a fluid through the purging path; wherein the sucking direction of the liquefied fuel within the sucking path is caused to substantially agree with the flow direction of the fluid in the purging path. It is therefore possible to cope even with a case where the purging path extending upward must be provided on the ceiling surface of the canister having the liquefied fuel treating function because of the restrictions in layout, without the need to bend the purging path, by extending the purging path upward as it is in parallel with the sucking path.

5 Claims, 9 Drawing Sheets

CANISTER HAVING LIQUEFIED FUEL TREATING FUNCTION

BACKGROUND OF THE INVENTION

The present invention relates to a canister which absorbs and treats an fuel vapor produced from a fuel tank of a vehicle and prevents the same from being released to the open air. More particularly, the invention relates to a canister having a liquefied fuel treating function for preliminarily treating a liquefied fuel.

DESCRIPTION OF THE RELATED ART

A conventionally known canister having a liquefied fuel treating function of this type preliminarily treats a liquefied fuel by collecting the liquefied fuel in a liquid storing case 5 having an introducing path 3 communicating with a fuel tank or the like and a purging path 4 communicating with air inlet pipes of an engine or the like, attached to a wall surface 2*a* of a case main body 2 filled with an adsorbent adsorbing a fuel vapor, as shown in FIG. 14 (see Japanese Unexamined Patent Application Publication No. 9-88739). A relay pipe 6 communicating with the adsorbent projects from the wall surface 2*a* of the case main body 2. The relay pipe 6 is covered with the liquid storing case 5. The purging path 4 is bent at right angles in the middle, enters the liquid storing case 5, and extends to the proximity of the leading end of the relay pipe 6. A suction pipe 7 for the liquefied fuel is attached to the purging path 4 in the liquid storing case 5. At the attachment position of the suction pipe 7, the axis of the purging path 4 is perpendicular to the axis of the suction pipe 7.

When the pressure of the fuel vapor in the fuel tank exceeds a certain level, the fuel vapor enters the liquid storing case 5 from the introducing path 3 via a hose member 8. The fuel vapor enters the case main body 2 from the relay pipe 6, adsorbed by the adsorbent 1, and discharged from an open air path 9. The fuel liquefied again in the hose member 8 is stored in the liquid storing case 5. When the engine operates and a negative pressure is produced in an air inlet pipe, on the contrary, air is introduced from an open air path 9, and the fuel adsorbed by the adsorbent 1 is separated. Fluids such as air and the separated fuel are fed to the suction pipe 7 via the relay pipe 6 and the purging path 4.

When the fluid passes through the purging path 4, because the throttle 4*a* is provided in the purging path 4, the liquefied fuel stored in the liquid storing case 5 is sucked up by a suction pipe 7, and a mixture with the separated fuel is sent to the suction pipe side.

In the conventional canister having a liquefied fuel treating function, however, the fluid flowing through the purging path 4 flows in a direction (2) always perpendicular to the sucking direction (1) of the liquefied fuel. As a result, when providing the purging path 4 on the ceiling surface of the canister having the liquefied fuel treating function because of the restrictions on layout, it is necessary to bend the purging path 4 in the middle as shown in FIG. 14. Bending of the purging path 4 results in a larger pressure loss.

SUMMARY OF THE INVENTION

The present invention has therefore an object to provide a canister having a liquefied fuel treating function, which permits coping flexibly with restrictions on layout without the need to bend the purging path in the middle.

The present invention will now be described.

The aforementioned problems are solved in the first aspect of the invention by means of a canister having a liquefied fuel treating function, comprising a liquid storing case having an introducing path communicating with a fuel tank and the like, and a purging path communicating with air inlet pipes of an engine and the like; and a sucking path, provided within the liquid storing case, and sucking the liquefied fuel stored in the liquid storing case; which sucks up the liquefied fuel onto the purging path side by use of the flow of a fluid through the purging path; wherein the sucking direction of the liquefied fuel within the sucking path is caused to substantially agree with the flow direction of the fluid in the purging path.

According to this aspect of the invention, when the engine operates, there occurs a negative pressure in the air inlet pipe, and air and the fluid including the fuel vapor separated from the adsorbent by air flows through the purging path. Since the fluid flows from the liquid storing case having a larger path cross-sectional area into the purging path having a smaller path cross-sectional area, the flow velocity is increased at the purging path. This produces a negative pressure in the purging path. The liquefied fuel stored in the liquid storing case is sucked up by this negative pressure, and taken out onto the purging path side. Because the sucking direction of the liquefied fuel in the sucking path substantially agrees with the flow direction of the fluid in the purging path, upward extension of the purging path in parallel with the sucking path permits coping with a restriction on layout requiring provision of the purging path extending upward on the ceiling surface of the canister having the liquefied fuel treating function, without the need to bend the purging path.

In a second aspect of the invention, in the canister having the liquefied fuel treating function of the first aspect of the invention, a throttle enlarging toward the upstream is provided in the purging path; the sucking path is provided in the throttle; and a flow of the fluid is produced between the outer periphery of the sucking path and the inner periphery of the throttle.

According to this aspect of the invention, the fluid flows between the inner periphery of the throttle and the outer periphery of the sucking path, and the liquefied fuel is sucked up through the sucking path. The sucking direction (1) of the liquefied fuel thus substantially agrees with the flow direction (2) of the fluid. The flow velocity of the fluid is increased in the throttle, leading to a larger negative pressure in the purging path, hence to an increase in the sucking force of the liquefied fuel. Furthermore, because the sucking path is provided in the purging path, it is possible to reduce the size of the liquid storing case.

In a third aspect of the invention, in the canister having the liquefied fuel treating function of the second aspect of the invention, the throttle is formed substantially into a conical shape of which the cross-section becomes gradually larger toward the upstream.

According to this aspect of the invention, the throttle never becomes steeply larger toward the upstream, thus reducing the pressure loss through the throttle.

In the fourth aspect of the invention, in the canister having the liquefied fuel treating function of any one of the first to third aspects, an orifice is provided in the sucking path.

According to this aspect of the invention, the flow rate taken out onto the purging path is adjusted by the orifice.

In the fifth aspect of the invention, in the canister having the liquefied fuel treating function of the first aspect, said purging path and said sucking path are adjacent to each other, and said purging path and said sucking path extend in the same direction.

DESCRIPTION OF THE PREFERRED EMBODIMENTS

Figure 1:
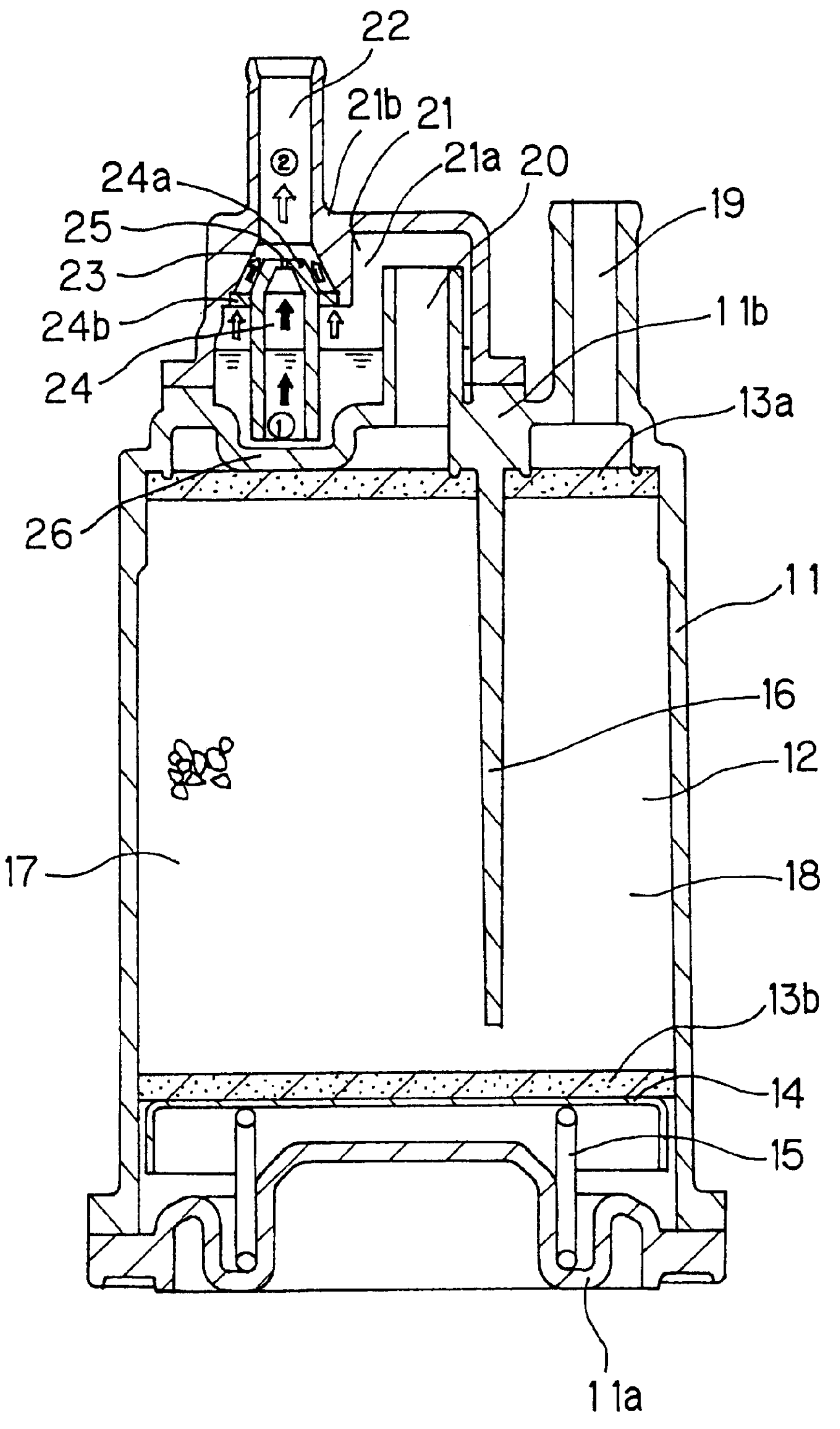
FIG. 1 is a sectional view of the canister having a liquefied fuel treating function in a first embodiment of the present invention.

FIG. 1 illustrates a first embodiment of the canister having a liquefied fuel treating function of the present invention: a case main body 11 made of a synthetic resin has substantially a rectangular parallelepiped shape, and is filled with an adsorbent 12 such as activated carbon. Aerated pads 13*a* and 13*b* are arranged on the upper and lower surfaces of the adsorbent 12, and a grid 14 is arranged on the lower surface of the pad 13*b*. A coil spring 15 is provided between the grid 14 and the bottom 11*a* of the case main body 11 to impart a force to the grid 14 against the adsorbent 12 so as to adjust the degree of compactness of the adsorbent 12.

The case main body 11 is divided into a first adsorbent chamber 17 and a second adsorbent chamber 18 to the right and left by a partition 16 hung from the upper wall 11*b* of the case main body 11. An open air path 19 is formed on the second adsorbent chamber 18 side of the upper wall 11*b*. A relay pipe 20 communicating with the interior of the case main body 11 is formed on the first adsorbent chamber 17 side of the upper wall 11*b*.

A liquid storing case 21 is attached to the first adsorbent chamber 17 side of the upper wall 11*b* so as to cover the relay pipe 20. An introducing path (not shown) communicating with a fuel tank and the like is formed on a side wall 21*a* of the liquid storing case 21. A purging path 22 communicating with air inlet pipes of an engine and the like is formed on the upper wall 21*b* of the liquid storing case 21. A throttle 23 enlarging toward the upstream is formed in a lower portion of the purging path 22. The throttle 23 is formed substantially into a conical shape so that the sectional area thereof becomes gradually larger toward the upstream.

Figure 2:
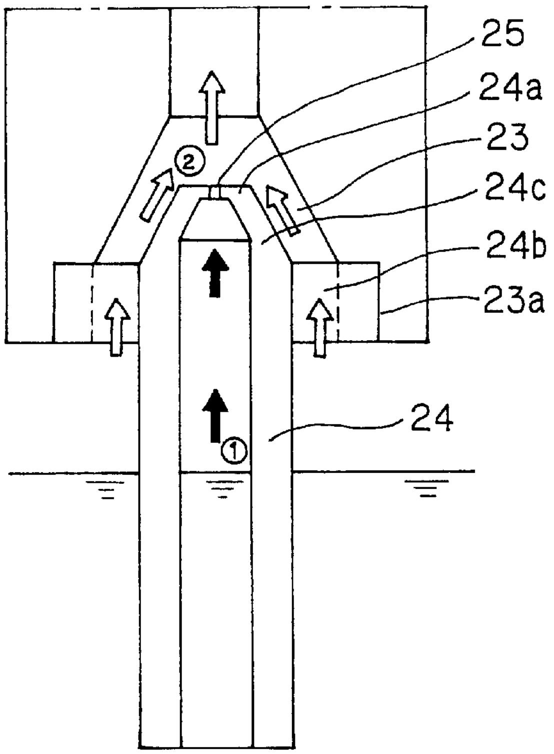
FIG. 2 is a sectional view of the suction pipe of the canister having the liquefied fuel treating function shown in FIG. 1.
Figure 3:
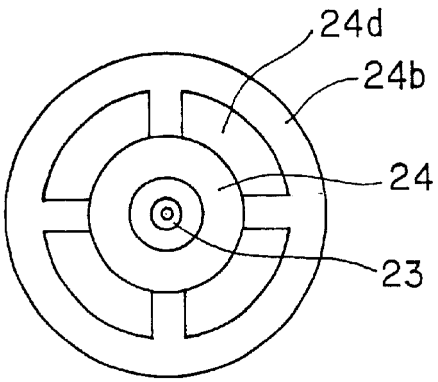
FIG. 3 is a bottom view of the suction pipe shown in FIG. 2.

FIG. 2 is an enlarged view illustrating a suction pipe 24 serving as a sucking path. The suction pipe 24 made of a synthetic resin is arranged in the throttle 23. The axis of the throttle 23 and the axis of the suction pipe 24 substantially agree with each other. The upper portion 24*c* of the suction pipe 24 is formed into a conical shape having a sectional area gradually becoming larger toward the upstream in concert with the conical shaped throttle 23. More specifically, a path having a ring-shaped cross-section of which the diameter becomes gradually larger toward the upstream is formed between the outer periphery of the suction pipe 24 and the inner periphery of the throttle 23, and a fluid flows through this path. The upper end of the suction pipe 24 is covered with a ceiling plate 24*a*, and an orifice 25 is formed at the center of the ceiling plate 24*a*. A flange 24*b* for attachment to the throttle 23 is formed on the outer periphery of the suction pipe 24, and as shown in FIG. 3, a notch 24*d* is partially cut in the flange 24 to permit passage of the fluid. On the other hand, an engagement hole 23*a* with the flange 24*b* is formed in the throttle 23. As shown in FIG. 1, a cavity 26 for storing the liquefied fuel is formed in the upper wall 11*b* of the case main body 11, and the lower end of the suction pipe 24 extends to the interior of the cavity 26.

In an actual case, the canister having the liquefied fuel treating function is set, as shown in FIG. 1, in an upright posture at a prescribed position so that the purging path 22 and the open air path 19 are directed upward. When pressure of the fuel vapor in the fuel tank or pressure of a float chamber provided in a carburetor of the vehicle exceeds a certain level, the fuel vapor flows into the liquid storing case 21 via the introducing path. Then, the fuel vapor passes through the relay pipe 20 provided in the liquid storing case 21, then through the first adsorbent chamber 17, passes by the leading end of the partition 16, passes through the second adsorbent chamber 18, is adsorbed up to a state in which almost no fuel remains, and released to outside from the open air path 19. The fuel liquefied again in the introducing path such as a hose is stored in the liquid storing case 21.

During operation of the engine, a negative pressure is produced in the air inlet pipe, and air is introduced by this negative pressure from the open air path 19 into the case main body 11. Contrary to the flow adsorbing the fuel vapor, air first passes through the second adsorbent chamber 18, passes by the leading end of the partition 16, and then, passes through the first adsorbent chamber 17. The fuel adsorbed by the adsorbent is separated by air. The fluid such as air and the separated fuel pass through the relay pipe 20, and then through the purging path 22 open into the liquid storing case 21, and is fed to the air inlet pipe.

Because the fluid flows from the liquid storing case 21 having a path sectional area into the throttle 23 of the purging path 22 having a smaller path sectional area, the flow velocity becomes higher in the throttle 23. As a result, a negative pressure is produced in the throttle 23, and the liquefied fuel stored in the liquid storing case 21 is sucked up by this negative pressure. The liquefied fuel rises up through the suction pipe 24, and sprayed from the orifice 25 into the purging path 22. As shown in FIGS. 1 and 2, the liquefied fuel is sucked up through the suction pipe 24, and the fluid flows between the outer periphery of the suction pipe 24 and the inner periphery of the throttle 23. The sucking direction (1) of the liquefied fuel and the flow direction (2) of the fluid therefore substantially agree with each other. When restrictions are imposed on the layout so as to provide the purging path 22 extending upward on the ceiling surface of the canister having the liquefied fuel treating function, it suffices to extend it upward in parallel with the suction pipe 24 without bending the purging path 22, as shown in FIG. 1. Since it is not necessary to bend the purging path 22 and it is possible to reduce the length thereof, the pressure loss in the purging path 22 can be reduced.

Figure 4:
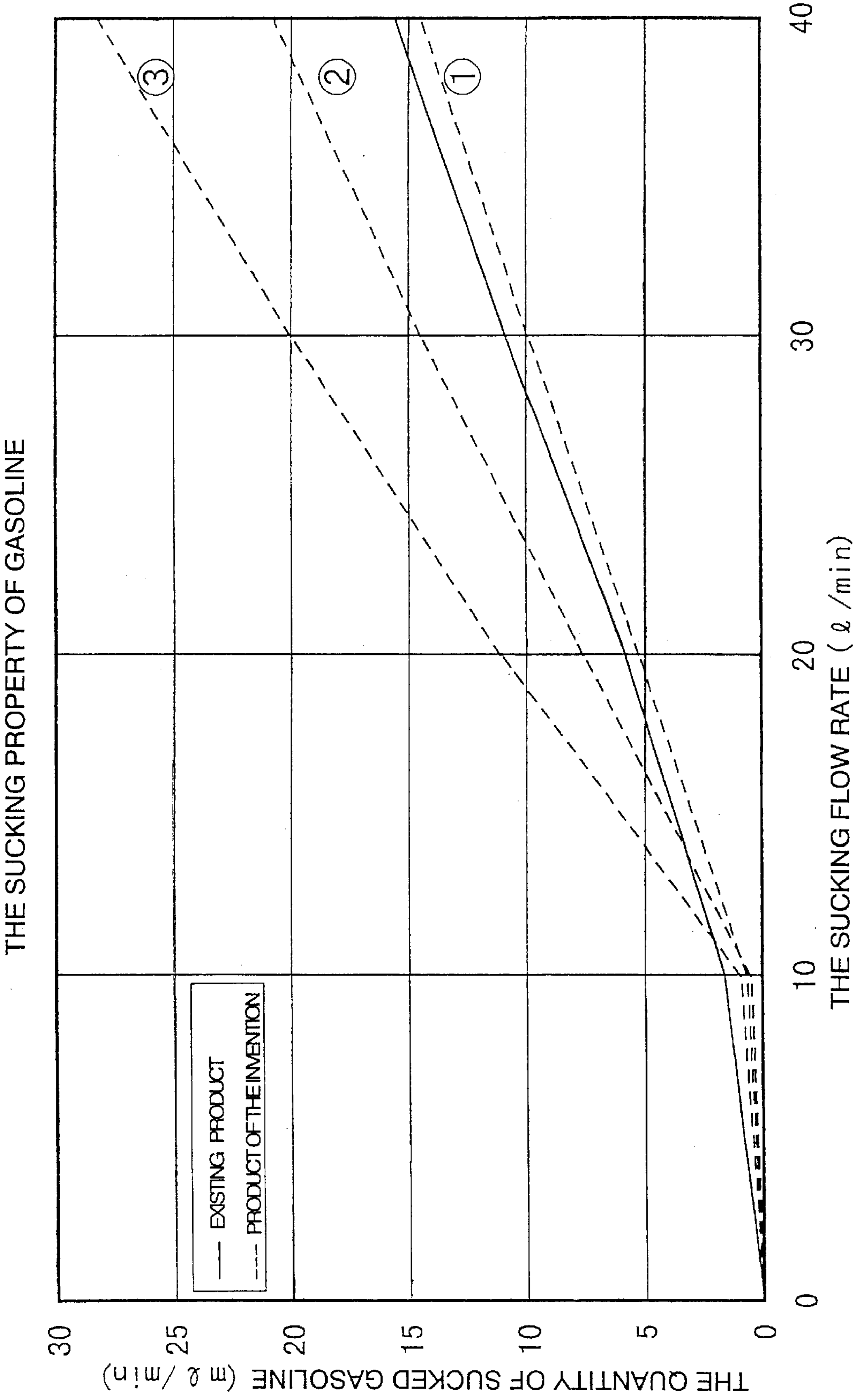
FIG. 4 is a graph illustrating the sucking property of gasoline of the canister having the liquefied fuel treating function shown in FIG. 1.

FIG. 4 illustrates gasoline sucking property with various diameters of the orifice 25. The abscissa represents the sucking flow rate (l/min), and the ordinate, the quantity of sucked gasoline (ml/min). The term the sucking flow rate as used herein means the flow rate of the fluid flowing through the purging path 22, and the term the quantity of sucked gasoline means the flow rate of the liquefied fuel sprayed onto the purging path 22, i.e., the flow rate of the liquefied fuel flowing through the suction pipe 22. In FIG. 4, (1) represents the case with an orifice 25 diameter of 0.4 mm; (2), the case with an orifice diameter of 0.5 mm; and (3), the case with an orifice of 0.6 mm. The solid line in FIG. 4 represents the gasoline sucking property of the conventional canister (existing product). As shown in FIG. 4, a sucking flow rate of under 10 l/min leads to a quantity of sucked gasoline of almost 0. With a sucking flow rate of over 10 l/min, the quantity of sucked gasoline linearly increases in proportion to the sucking flow rate. According as the orifice 25 diameter becomes gradually larger from 0.3 mm to 0.4 mm and 0.5 mm, the quantity of sucked gasoline becomes gradually larger. With an orifice diameter of 0.3 mm, there is available a property substantially equal to the gasoline sucking property of the conventional canister. For an orifice diameter of 0.4 mm or 0.5 mm, there is available a quantity of sucked gasoline over that of the conventional canister.

Figure 5:
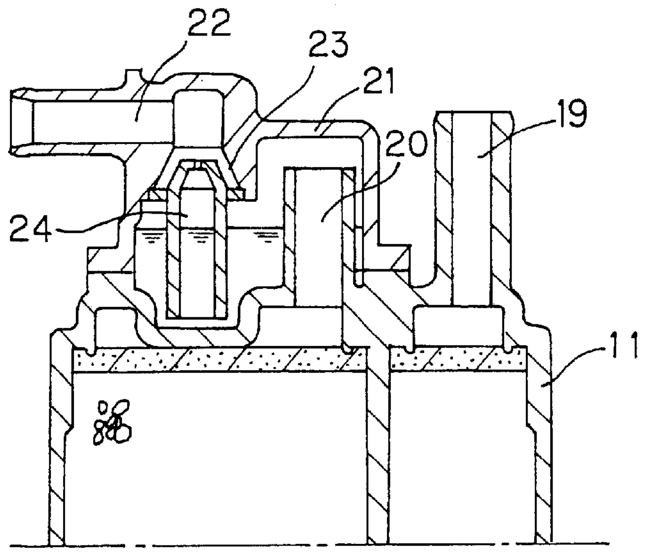
FIG. 5 is a sectional view illustrating another example of the purging path.

FIG. 5 illustrates another example of the purging path 22. As shown in FIG. 5, the purging path 22 may be directed horizontally by bending the purging path 22 in the upstream of the throttle 23. The components including the suction pipe 24 and the case main body 11 are the same as in the above-mentioned canister having the liquefied fuel treating function. The same reference numerals are therefore assigned to such components, and the description thereof is omitted. In this example, it is possible to adopt the configuration corresponding to the layout in which the purging path 22 is directed horizontally.

Figure 6:
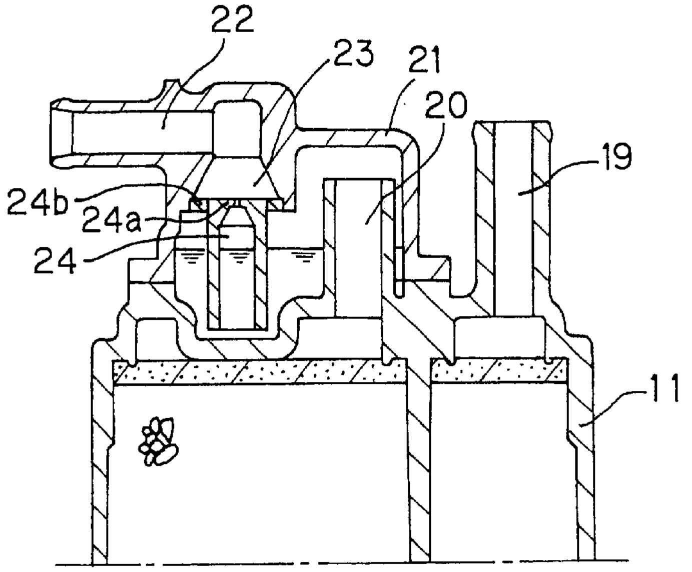
FIG. 6 is a sectional view illustrating another example of the suction pipe.

FIG. 6 illustrates a still another example of the suction pipe 24. The suction pipe 24 may be formed flat without forming the upper portion thereof into a conical shape. The upper end of the suction pipe 24 is covered with a ceiling plate 24*a*, and a flange 24*b* fitted into the throttle 23 is formed around the upper end thereof. An orifice is formed at the center of the ceiling plate 24*a*. In this example as well, the liquefied fuel can be sucked through the suction pipe 24. In this embodiment, it is easier to fabricate the suction pipe 24.

Figure 7:
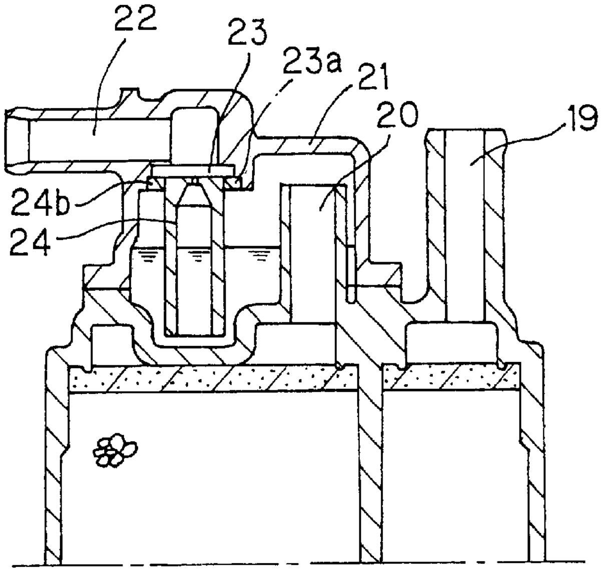
FIG. 7 is a sectional view illustrating still another example of the purging path and the suction pipe.

FIG. 7 illustrates further another embodiment of the purging path 22. The suction pipe 24 is formed substantially into a cylindrical shape as in the embodiment shown in FIG. 6. In this embodiment, the throttle 23 of the purging path 22 is not formed into a conical shape, but the inside bore thereof is formed into a certain cylindrical shape. An engagement hole 23*a* of the flange 24*b* of the suction pipe 24 is formed with a step in the lower portion of the throttle 23. In this embodiment, it is easy to fabricate the purging path 22 and the suction pipe 24.

Figure 8:
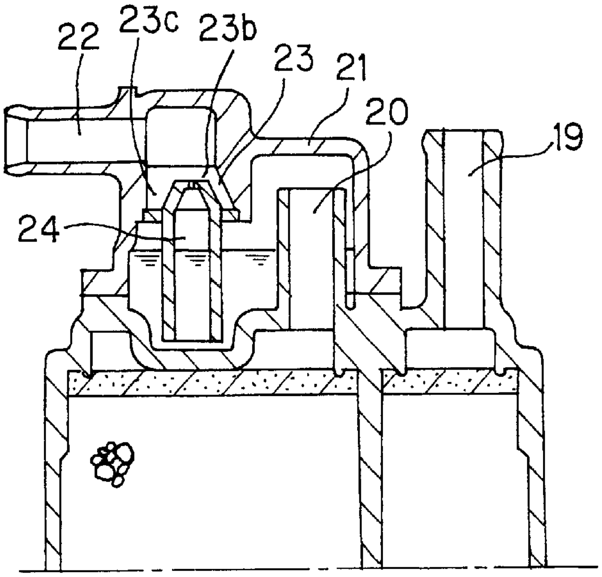
FIG. 8 is a sectional view illustrating further another example of the purging path.

FIG. 8 illustrates still another embodiment of the purging path 22. In this embodiment, the out-course side 23*b* of the throttle 23 relative to the center line is formed into a conical shape, and the in-course side is formed into a cylindrical shape. When the throttle 23 is formed as described above, it is possible to reduce loss in the purging path 22 even when the purging path 22 is bent.

Figure 9:
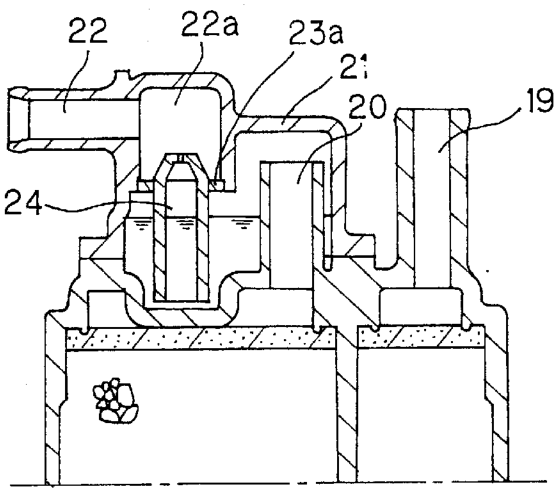
FIG. 9 is a sectional view illustrating further another example of the purging path.

FIG. 9 illustrates further another embodiment of the purging path 22. In this embodiment, the sectional area of the purging path 22 is expanded at the bent portion 22*a*. An engagement hole 23*a* for engagement with the flange 24*b* of the suction pipe 24 is formed at the lower end of the bent portion 22*a*. In this embodiment also, it is possible to suck up the liquefied fuel through the suction pipe 24. Working of the purging path 22 is made further easier in this embodiment.

Figure 10:
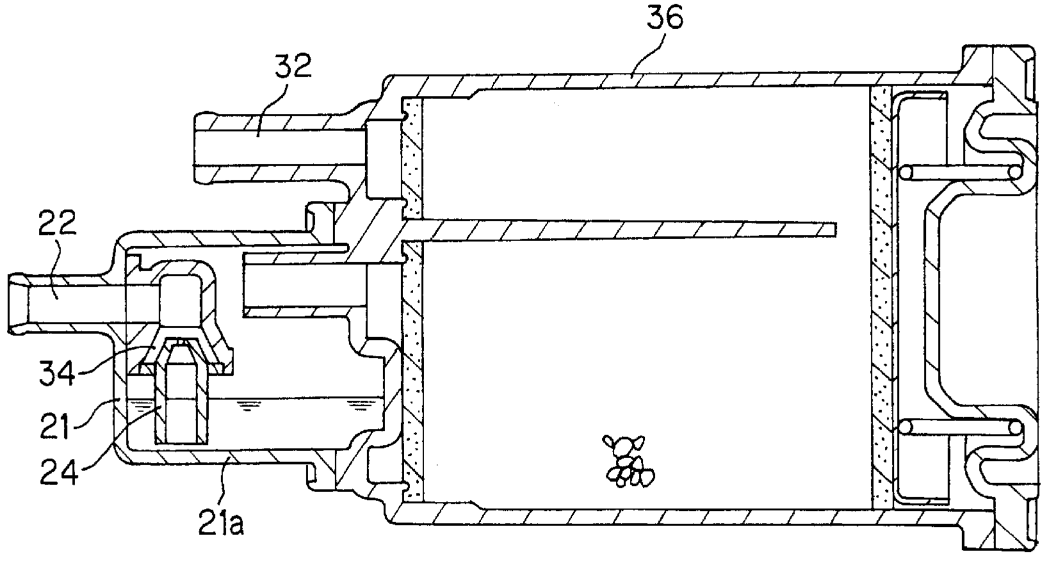
FIG. 10 is a sectional view illustrating the canister having the liquefied fuel treating function in a second embodiment of the invention.

FIG. 10 illustrates the canister having the liquefied fuel treating function of a second embodiment of the invention. In this embodiment, the case main body 36 is horizontally arranged so that the purging path 22 and the open air path 32 are directed in the horizontal direction. As a result, in this embodiment, the side wall 21*a* of the liquid storing case 21 serves as a bottom for storing the liquefied fuel. The purging path 22 is horizontally extended, and is bent downward in the liquid storing case 21. A throttle 34 is formed in the lower part of the purging path, and the suction pipe 24 is arranged in the throttle 34 with an axis aligned with the axis of the purging path 22. Since the case main body 36 and the internal configuration thereof are the same as in the canister having the liquefied fuel treating function in the above-mentioned first embodiment, the same reference numerals are assigned and the description is omitted here. In this embodiment also, the liquefied fuel is sucked by the suction pipe 24 and taken out onto the purging path 22 side.

Figure 11:
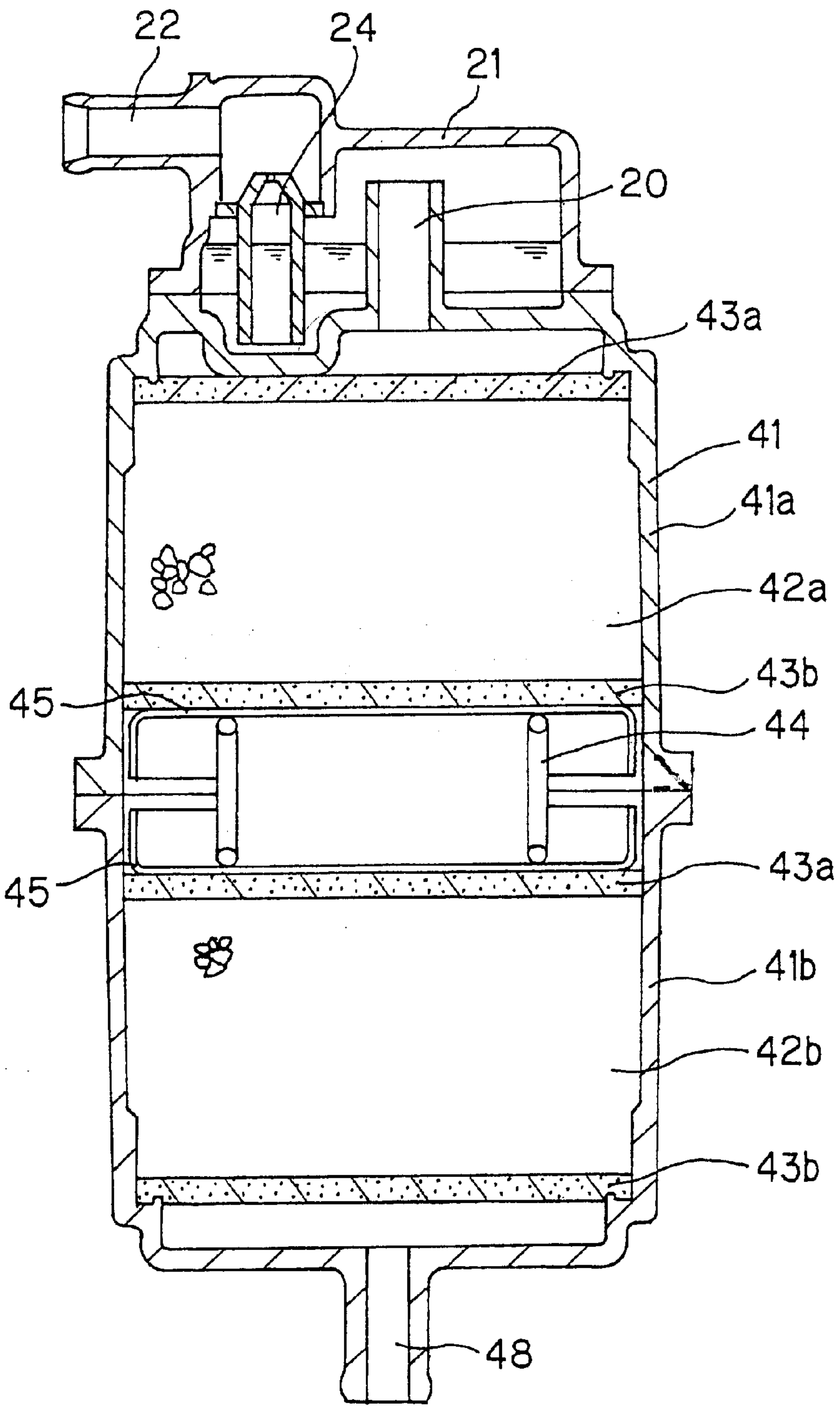
FIG. 11 is a sectional view illustrating the canister having the liquefied fuel treating function in a third embodiment of the invention.

FIG. 11 illustrates the canister having a liquefied fuel treating function of a third embodiment of the invention. In this embodiment, the adsorbents 42*a* and 42*b* are divided into two in the vertical direction, and the case main bodies 41*a* and 41*b* are also vertically divided into two in agreement with the adsorbents 42*a* and 42*b*. Pads 43*a* and 43*b* serving as filters are arranged on the upper and lower surfaces of the respective adsorbents thus divided into two. A coil spring 44 for adjusting compactness of the adsorbents is provided between the individual adsorbents divided into two. A grid 45 is arranged between the coil spring 44 and the pads 43*a* and 43*b*. The case main body 41 is divided into two substantially at the axial center of the case main body 41 in alignment with the adsorbents 42*a* and 42*b*. The joint surfaces of the case main body divided into two for easy assembling are located in the space where the adsorbent 42*a* or 42*b* is not provided, and connected and welded after assembly.

The liquid storing case 21 is attached to the upper wall of the case main body 41. The components formed on the liquid storing case 21, such as the purging path 22, the introducing path, and the suction pipe 24 arranged in the purging path 22 are substantially the same as in the canister having the liquefied fuel treating function of the aforementioned first embodiment. The same reference numerals are therefore assigned to these components, and the description is omitted here. An open air path 48 is formed in the lower part of the case 41. The fuel vapor introduced from the introducing path passes sequentially through the upper and lower adsorbent chambers, and is discharged from the open air path 48.

Figure 12:
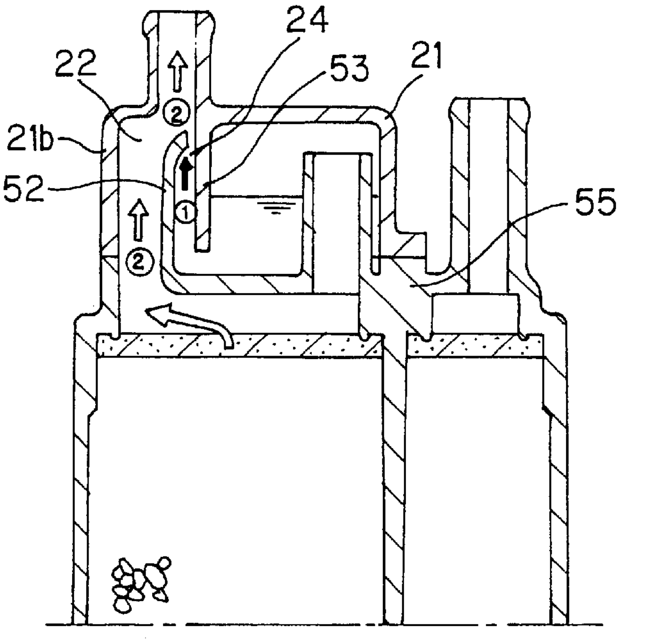
FIG. 12 is a sectional view illustrating the canister having the liquefied fuel treating function of a fourth embodiment of the invention.

FIG. 12 illustrates the canister having the liquefied fuel treating function of a fourth embodiment of the invention. In this embodiment, the sucking path 24 is not formed into a tubular shape, but formed between a partition wall 52 formed integrally with the case main body 55 and a path wall 53 formed integrally with the liquid storing case 21. The upper portion of the partition wall 52 is bent so as to narrow the sucking path 24. The purging path 22 is formed between the side wall 21*b* of the liquid storing case 21 and the partition wall 52.

More specifically, the purging path 22 and the neighboring sucking path 24 extend in the same direction, so that the liquefied fuel sucking direction (1) in the sucking path 24 and the flow direction (2) of the fluid in the purging path 22 agree with each other. In this embodiment as well, when the fluid flows through the purging path 22, the liquefied fuel is sucked through the sucking path 24, and taken out onto the purging path 22 side.

Figure 13:
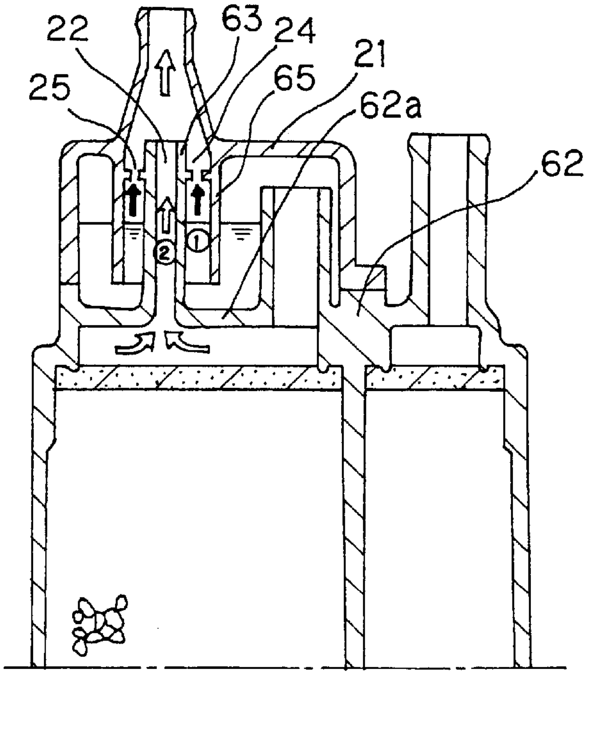
FIG. 13 is a sectional view illustrating the canister having the liquefied fuel treating function in a fifth embodiment of the invention.
Figure 14:
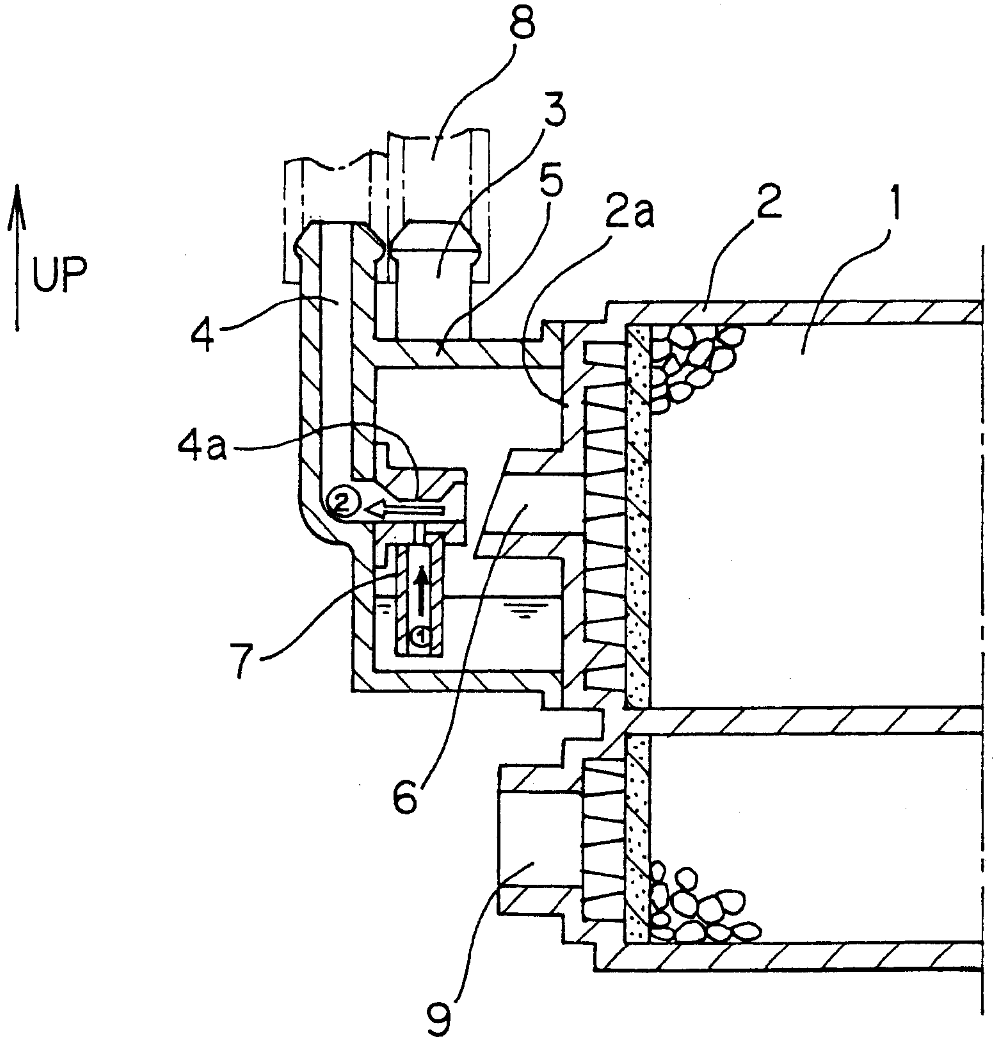
Fig. 14 PRIOR ART
FIG. 14 is a sectional view of a conventional canister having the liquefied fuel treating function.

FIG. 13 illustrates the canister having the liquefied fuel treating function of a fifth embodiment of the invention. In this embodiment, the sucking path 24 is formed in an annular shape between an inner cylinder 63 projecting from the upper wall 62*a* of the case main body 62 and an outer cylinder 65 formed integrally with the liquid storing case 21. An orifice 25 is formed in this sucking path 24, and the interior of the inner cylinder 63 serves as the purging path 22. More specifically, in this embodiment, unlike the canister having the liquefied fuel treating function of the first embodiment, the sucking path 24 is provided on the outer periphery of the purging path 22. The sucking direction (1) of the liquefied fuel in the sucking path 24 substantially agrees with the flow direction (2) of the fluid in the purging path 22. In this embodiment as well, when the fluid flows through the purging path 22, the liquefied fuel is sucked up through the sucking path 24, and taken out onto the purging path 22 side.

According to the present invention, as described above, the canister having the liquefied fuel treating function comprises a liquid storing case having an introducing path communicating with a fuel tank and the like, and a purging path communicating with air inlet pipes of an engine and the like; and a sucking path, provided in the liquid storing case, and sucking the liquefied fuel stored in the liquid storing case; which sucks up the liquefied fuel onto the purging path side by use of the flow of a fluid through the purging path; wherein the sucking direction of the liquefied fuel within the sucking path is caused to substantially agree with the flow direction of the fluid in the purging path. It is therefore possible to cope even with a case where the purging path extending upward must be provided on the ceiling surface of the canister having the liquefied fuel treating function because of the restriction in layout, without the need to bend the purging path, by extending the purging path upward as it is in parallel with the sucking path.

What is claimed is:

1. A canister having a liquefied fuel treating function, comprising:

a liquid storing case having an introducing path communicating with a fuel tank, and a purging path communicating with air inlet pipes of an engine; and a sucking path, provided with said liquid storing case, and sucking the liquefied fuel stored in said liquid storing case, which sucks up said liquefied fuel into said purging path by use of the flow of a fluid through said purging path, wherein the sucking direction of said liquefied fuel within said sucking path is caused to substantially agree with the flow direction of said fluid in said purging path, and said purging path and said sucking path are partitioned by a partition wall and are adjacent to each other and an upper portion of the partition wall is bent so as to narrow the sucking path.

2. A canister having a liquefied fuel treating function, comprising:

a liquid storing case having an introducing path communicating with a fuel tank, and a purging path communicating with air inlet pipes of an engine; and a sucking path, provided with said liquid storing case, and sucking the liquefied fuel stored in said liquid storing case, which sucks up said liquefied fuel into said purging path by use of the flow of a fluid through said purging path, wherein the sucking direction of said liquefied fuel within said sucking path is caused to substantially agree with the flow direction of said fluid in said purging path, and said sucking path is provided on the outer periphery of said purging path and an orifice is formed in said sucking path.

3. A canister having a liquefied fuel treating function, comprising:

a liquid storing case having an introducing path communicating with a fuel tank, and a purging path communicating with air inlet pipes of an engine; and a sucking path, provided with said liquid storing case, and sucking the liquefied fuel stored in said liquid storing case, which sucks up said liquefied fuel into said purging path by use of the flow of a fluid through said purging path, wherein the sucking direction of said liquefied fuel within said sucking path is caused to substantially agree with the flow direction of said fluid in said purging path, and a throttle enlarging toward the upstream is provided in said purging path; said sucking path is provided in said throttle; and a flow of said fluid is produced between the outer periphery of said sucking path and the inner periphery of said throttle.

4. A canister having a liquefied fuel treating function according to claim 3, wherein said throttle is formed substantially into a conical shape, of which the cross-section becomes gradually larger toward the upstream.

5. A canister having a liquefied fuel treating function according to claim 3, wherein an orifice is provided in said sucking path.

* * * * *